(12) United States Patent
Oshima (10) Patent No.: US 10,891,491 B2
(45) Date of Patent: Jan. 12, 2021

(54) IN-STORE MONITORING DEVICE, IN-STORE MONITORING METHOD, AND RECORDING MEDIUM

(71) Applicant: NEC Corporation, Tokyo (JP)

(72) Inventor: Akiko Oshima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 65 days.

(21) Appl. No.: 16/258,818

(22) Filed: Jan. 28, 2019

(65) Prior Publication Data

US 2019/0236378 A1    Aug. 1, 2019

(30) Foreign Application Priority Data

Jan. 31, 2018    (JP) ................................ 2018-015409

(51) Int. Cl.
| | |
|---|---|
| *G06K 9/00* | (2006.01) |
| *G06K 9/78* | (2006.01) |
| *G06T 1/00* | (2006.01) |
| *H04N 7/18* | (2006.01) |
| *G06Q 30/06* | (2012.01) |
| *G06T 7/292* | (2017.01) |

(52) U.S. Cl.
CPC ..... *G06K 9/00771* (2013.01); *G06K 9/00335* (2013.01); *G06K 9/78* (2013.01); *G06Q 30/0601* (2013.01); *G06T 1/0007* (2013.01); *G06T 7/292* (2017.01); *H04N 7/181* (2013.01); *G06T 2207/30196* (2013.01); *G06T 2207/30241* (2013.01)

(58) Field of Classification Search
CPC ........................... G06K 9/00771; G06K 10/00
See application file for complete search history.

(56) References Cited

U.S. PATENT DOCUMENTS

| | | | |
|---|---|---|---|
| 8,219,438 B1* | 7/2012 | Moon ................ | G06Q 30/0201 705/7.29 |
| 2011/0320322 A1* | 12/2011 | Roslak ............... | G06K 17/0022 705/28 |
| 2014/0214573 A1* | 7/2014 | Argue ................... | G06Q 20/20 705/21 |
| 2015/0127496 A1* | 5/2015 | Marathe ............... | G06Q 10/087 705/28 |

FOREIGN PATENT DOCUMENTS

| | | |
|---|---|---|
| JP | 2004-171241 A | 6/2004 |
| WO | 2015/140853 A1 | 9/2015 |

* cited by examiner

*Primary Examiner* — Myron Wyche (57) ABSTRACT

An in-store monitoring device includes a memory storing instructions, and at least a processor reading the instructions to perform: acquiring an image in which one or more shoppers are captured; detecting, from the image, one or more shoppers present in a predetermined area; generating, for each of the shoppers, information on number of goods obtained by the shoppers; and calculating a sum of numbers of goods obtained by the detected shoppers.

9 Claims, 6 Drawing Sheets

| TRAJECTORY ID | TIME-SERIES LOCATION INFORMATION (TIME / COORDINATE) | THE NUMBER OF SELECTED GOODS (NO. OF PCS) |
|---|---|---|
| 1 | (12:35:00／2.0;1.5;4.0)、<br>(12:35:15／2.5;1.0;4.0)、··· | 1 |
| 2 | (12:35:00／3.5;9.5;4.0)、<br>(12:35:15／3.5;8.5;4.0)、··· | 2 |
| 3 | (12:35:00／10.0;5.5;4.0)、<br>(12:35:15／10.0;5.5;4.0)、··· | 0 |
| ··· | ··· | ··· |

IN-STORE MONITORING DEVICE, IN-STORE MONITORING METHOD, AND RECORDING MEDIUM

This application is based upon and claims the benefit of priority from Japanese Patent Application No. 2018-015409, filed on Jan. 31, 2018, the disclosure of which is incorporated herein in its entirety by reference.

TECHNICAL FIELD

The present invention relates to an in-store monitoring device, an in-store monitoring method, and an in-store monitoring program and in particular, relates to a technology for monitoring inside of a store on the basis of images in which the inside of the store is captured.

BACKGROUND ART

In a mass retail store such as a convenience store, a supermarket, or another store, a shopper usually makes payment for goods in front of a cash register.

When the number of shoppers who form a line in front of the cash register increases, a store clerk predicts a shopper queuing time and determines whether to additionally open another cash register.

(Relative Art Document(s))
1. JP 2004-171241 A
2. WO 2015/140853 A1

SUMMARY

However, when the store clerk works in a backyard or an office, there is a case in which the store clerk fails to notice shoppers forming a line in front of the cash register (stagnation).

Further, the number of goods selected by the shopper is different for each shopper. Because the store clerk does not know the number of goods selected by the shoppers who form a line in front of the cash register, it is difficult for the store clerk to determine a shopper queuing time correctly. For example, even when the number of the shoppers who form a line in front of the cash register is small, if the number of the goods selected by those shoppers is large, the queuing time lengthens.

An object of the present invention is to correctly determine the shopper queuing time by calculating a sum of the numbers of goods selected by shoppers who form a line in front of a cash register.

An aspect of the invention is an in-store monitoring method. The in-store monitoring method includes acquiring an image in which one or more shoppers are captured; detecting, from the image, one or more shoppers present in an predetermined area; generating, for each of the shoppers, information on number of goods obtained by the shoppers; and calculating a sum of the numbers of goods obtained by the detected shoppers.

Another aspect of the invention is an in-store monitoring device. The in-store monitoring device includes a memory storing instructions and at least a processor. The at least a processor reads the instructions to perform: acquiring an image in which one or more shoppers are captured; detecting, from the image, one or more shoppers present in an area in front of a cash register; generating, for each of the shoppers, information on number of goods obtained by the shoppers; and calculating a sum of the numbers of goods obtained by the detected shoppers.

Another aspect of the invention is a non-transitory recording medium. The non-transitory recording medium stores an in-store monitoring program therein. The in-store monitoring program causing a computer to: acquire an image in which one or more shoppers are captured; detect one or more shoppers present in a predetermined area; generate, for each of the shoppers, information on number of goods obtained by the shoppers; and calculate a sum of the numbers of goods obtained by the detected shoppers.

EXAMPLE EMBODIMENT

In the following description, "register" is an abbreviation of "cash register".

(Configuration of an in-Store Monitoring Device 1)

Figure 1:
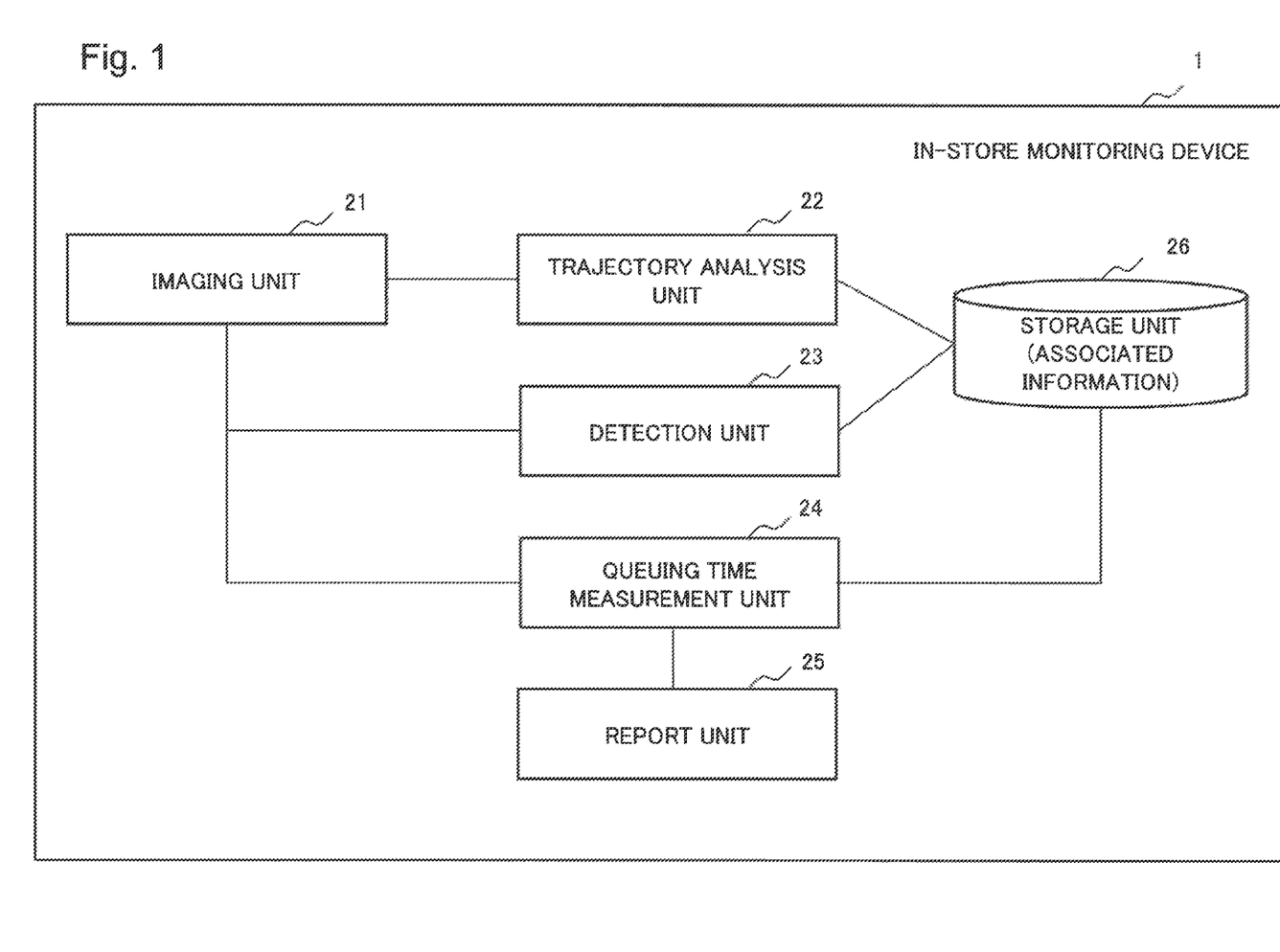
FIG. 1 is a block diagram showing a configuration of an in-store monitoring device according to an example embodiment 1.

FIG. 1 is a block diagram showing a configuration of an in-store monitoring device 1 according to the present example embodiment. As shown in FIG. 1, the in-store monitoring device 1 includes an imaging unit 21, a trajectory analysis unit 22, a unit 23 for detecting shopper's behavior in front of a commodity shelf (hereinafter, described as a detection unit 23), a queuing time measurement unit 24 (hereinafter, described as a measurement unit 24), a report unit 25, and a storage unit 26.

The imaging unit 21 captures images of an inside of a store and generates image data (moving picture data). The imaging unit 21 may be composed of one or more cameras to capture images. The imaging unit 21 transmits pixel data of which the captured image data is composed to the trajectory analysis unit 22, the detection unit 23, and the measurement unit 24.

The trajectory analysis unit 22 detects an area in which a person being a shopper is imaged by using the image data received from the imaging unit 21 and tracks the trajectory of the shopper. The detection unit 23 associates information for individually identifying the shopper with information indicating the number of goods selected from a commodity shelf by the shopper and stores them in the storage unit 26 as information on shopper/number of selected goods (refer to FIG. 2). The measurement unit 24 identifies the shopper present in an area in front of the register (described later) and acquires the information on the number of goods selected by the shopper present in the area in front of the register.

When a predetermined condition is satisfied, the report unit 25 reports a state in which the number of available registers is not enough. The report unit 25 may include, for example, a speaker or a rotating light (an alarm light).

The storage unit 26 stores the information on shopper/number of selected goods that is generated by the detection unit 23. The information on shopper/number of selected goods is information in which the information for identifying the shopper (for example, the image data in which the shopper is imaged, information indicating a feature of the shopper, information on the trajectory of the shopper, or the like) is associated with information on the number of goods selected by the shopper in the store. Here, the number of goods selected by the shopper represents the number of the goods that are picked up from the commodity shelf and held by the shopper. For example, the information indicating the feature of the shopper includes information indicating a feature value of a face of the shopper or a feature value of appearance of the shopper. However, the information indicating the feature of the shopper is not limited to these examples.

Figure 2:
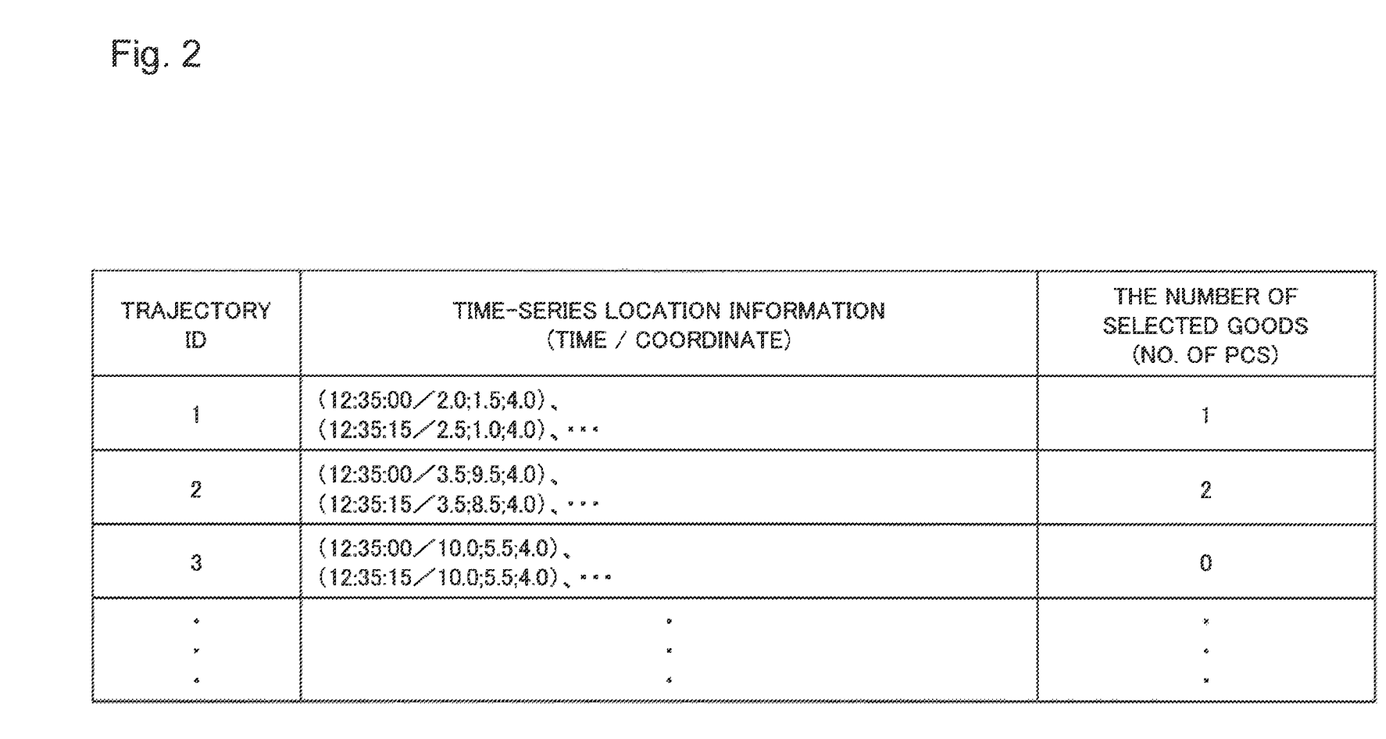
FIG. 2 is a figure showing an example of a database (DB) of information on shopper/number of selected goods that is stored in the storage unit of an in-store monitoring device according to the example embodiment 1.

FIG. 2 is a figure showing an example of the DB of the information on shopper/number of selected goods that is stored in the storage unit 26. In FIG. 2, the information for identifying the shopper is the information on the trajectory of the shopper. As shown in FIG. 2, in the DB of the information on shopper/number of selected goods, for example, an ID (trajectory ID) for identifying the trajectory of the shopper, time-series location information (time/coordinate) of the shopper, and the number of goods (the number of pieces) selected by the shopper may be associated with each other. Further, in FIG. 2, time-series locations of the shopper is represented in a three-dimensional viewpoint coordinate system when viewed from the camera of the imaging unit 21. Further, the information on shopper/number of selected goods is not limited to the DB shown in FIG. 2.

Further, the in-store monitoring device 1 may not include the imaging unit 21 and the storage unit 26. In this case, the in-store monitoring device 1 acquires image data captured by an external imaging device (for example, a camera). Further, the in-store monitoring device 1 stores the information on shopper/number of selected goods in an external storage device (for example, a memory).

(First Register Queuing Determination Process)

Figure 3:
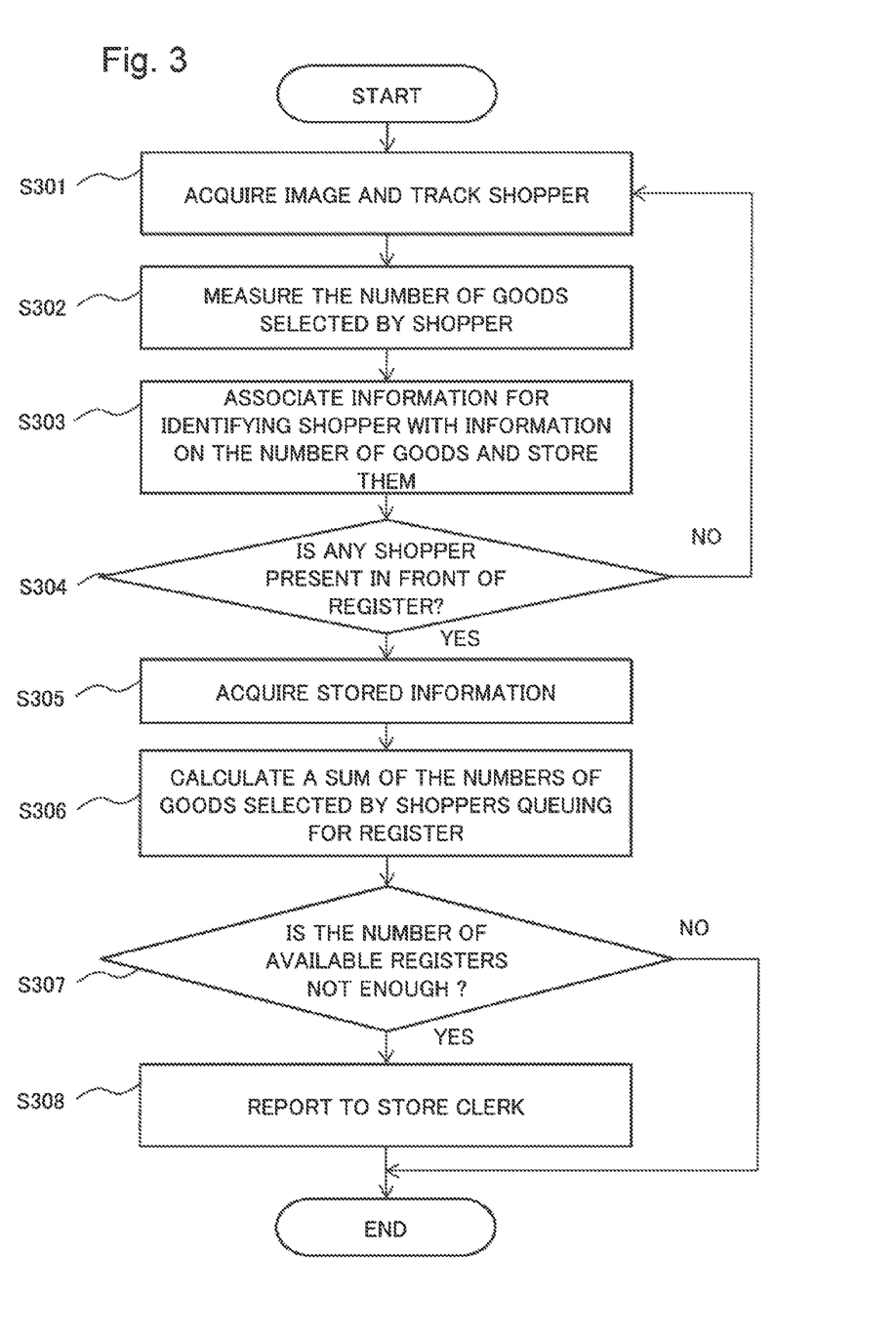
FIG. 3 is a flowchart showing a first example of operation of a register queuing determination process performed by the in-store monitoring device according to the example embodiment 1.

An example of operation of the register queuing determination process performed by the in-store monitoring device 1 according to the present example embodiment will be described with reference to FIG. 3. FIG. 3 is a flowchart showing a flow of operation of a first register queuing determination process performed by the in-store monitoring device 1.

As shown in FIG. 3, in the first register queuing determination process, the trajectory analysis unit 22 acquires the image data from the imaging unit 21 and tracks the trajectory of the shopper by using the acquired image data (S301). More specifically, the trajectory analysis unit 22 detects the shopper from each image frame of which the image data is composed at fixed intervals, generates the information on the trajectory of the shopper by analyzing a time change of the detected location of the shopper, and outputs it. Further, a technology to track the trajectory of the shopper on the basis of the images is described in for example, patent literature 1. Therefore, the detailed description about the technology to track the trajectory of the shopper will be omitted in the present example embodiment.

The detection unit 23 detects behavior performed at the commodity shelf (or gondola) by the shopper (shopper's behavior in front of the commodity shelf) by analyzing the image data received from the imaging unit 21 and measures the number of goods selected from the commodity shelf by the shopper (S302). Further, a technology to detect the shopper's behavior in front of the commodity shelf on the basis of the images is described in, for example, patent literature 2. The detailed explanation about the shopper's behavior in front of the commodity shelf will be omitted in the present example embodiment.

The detection unit 23 associates the information for identifying the shopper with the information on the number of goods selected from the commodity shelf by the shopper and stores them in the storage unit 26 as the information on shopper/number of selected goods (S303). Here, for example, the information for identifying the shopper may be the information on the trajectory of the shopper that is generated by the trajectory analysis unit 22 or the image data in which the shopper is imaged (one or more frames of the image data captured by the imaging unit 21). When the information for identifying the shopper is the information on the trajectory of the shopper, the trajectory analysis unit 22 can easily generate the information on the trajectory of the shopper by using an existing trajectory analysis technology. Further, because it is not necessary for the detection unit 23 to identify an individual shopper, the detection unit 23 can protect privacy of the shopper.

The measurement unit 24 detects a state in which the shopper exists in the area in front of the register from the image data received from the imaging unit 21. The area in front of the register is an area in front of the cash register where shoppers gather to make payment. The area in front of the register is set in advance according to a structure of the store and a register arrangement.

When the shopper exists in the area in front of the register ("Yes" in step S304), the measurement unit 24 looks up the information on shopper/number of selected goods that is stored in the storage unit 26, identifies the shopper present in the area in front of the register, and also acquires the information on the number of goods selected by the shopper present in the area in front of the register (S305).

When the information for identifying the shopper is the image data in which the shopper is imaged, the shopper present in the area in front of the register is identified on the basis of the feature value of an image part corresponding to the shopper. In this case, the measurement unit 24 extracts data indicating a feature of a face or clothes of the shopper present in the area in front of the register on the basis of the image data captured by the imaging unit 21 as a first feature value. Further, the measurement unit 24 extracts the feature value of the image part corresponding to the shopper from the image data in which the shopper is imaged that is stored in the storage unit 26 as a second feature value. The time measurement unit 24 checks the first feature value against the second feature value. As a result, the image of the shopper which has the same feature value as the feature value (the first feature value) of the image part corresponding to the shopper present in the area in front of the register is identified.

When the information for identifying the shopper is the information on the trajectory of the shopper, the shopper present in the area in front of the register is identified on the basis of the location of the shopper. In this case, the measurement unit 24 measures the location of the shopper present in the area in front of the register on the basis of the image captured by the imaging unit 21. As the information for identifying the shopper, the measurement unit 24 searches for the trajectory of the shopper of which the position of an end of the trajectory is included in the area in front of the register from among the information on the trajectory of the shopper that are stored in the storage unit 26. Accordingly, the trajectory corresponding to the shopper present in the area in front of the register is identified.

The measurement unit 24 identifies all the shoppers present in the area in front of the register by this means. Next, the measurement unit 24 calculates a sum of the numbers of goods corresponding to the images of the identified shoppers or a sum of the numbers of goods corresponding to the identified trajectories, in other words, a sum of the numbers of goods selected by all the shoppers present in the area in front of the register (S306).

In the first register queuing determination process, the measurement unit 24 acquires information on the number of the available registers. The measurement unit 24 determines whether or not the number of the available registers is enough. Specifically, when the sum of the numbers of goods selected by the shoppers present in the area in front of the register is greater than a threshold value determined according to the number of the available registers, the measurement unit 24 determines that the number of the available registers is not enough.

When the number of the available registers is not enough ("Yes" in S307), the measurement unit 24 makes the report unit 25 report it (S308). By this report, for example, the store clerk may be merely summoned or a suggestion that another register should be additionally opened up may be made.

(Second Register Queuing Determination Process)

Figure 4:
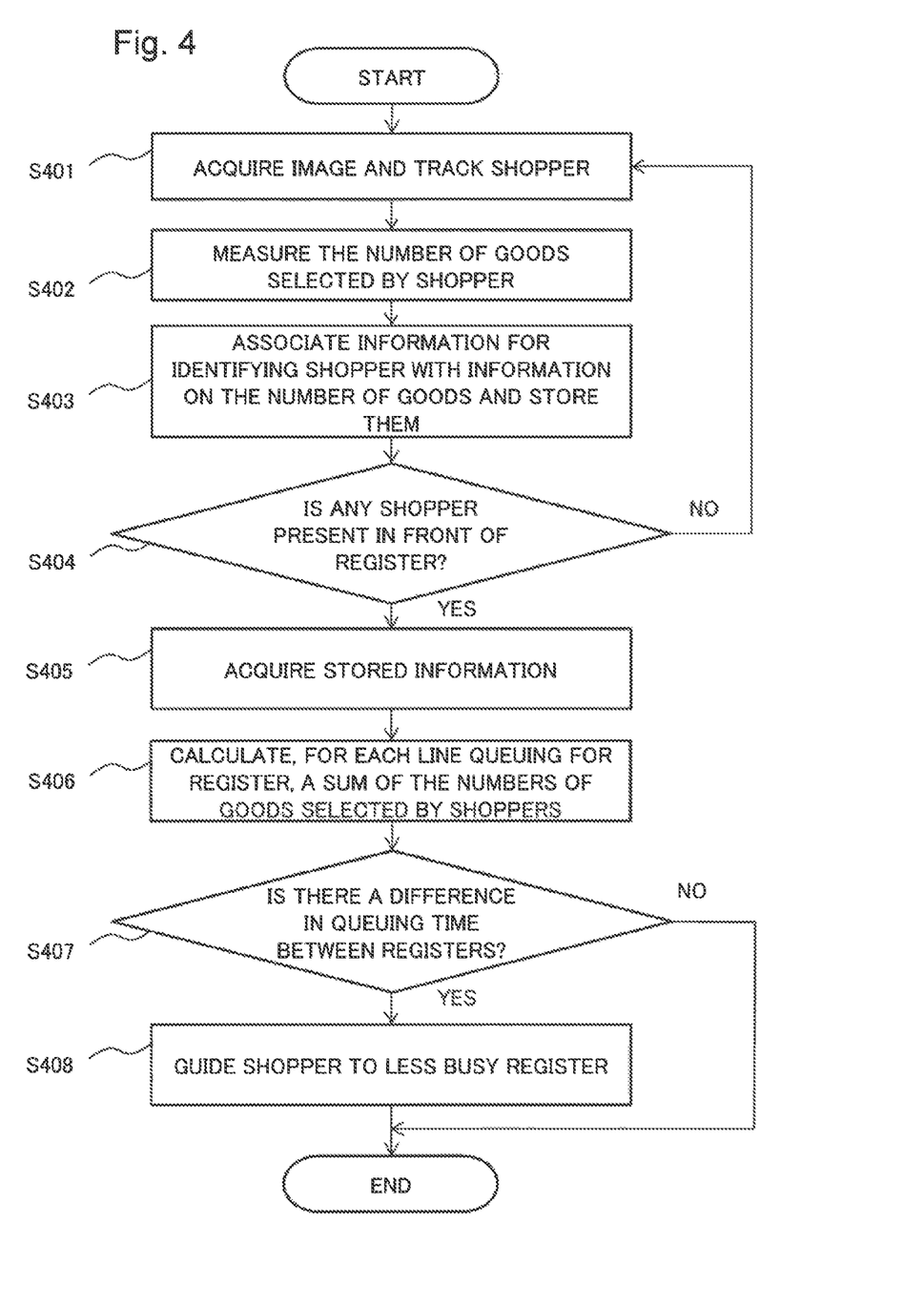
FIG. 4 is a flowchart showing a second example of operation of a register queuing determination process performed by an in-store monitoring device according to an example embodiment 1.

An example of another operation of the register queuing determination process performed by the in-store monitoring device 1 according to the present example embodiment will be described with reference to FIG. 4. FIG. 4 is a flowchart showing a flow of operation of a second register queuing determination process performed by the in-store monitoring device 1.

As shown in FIG. 4, in the second register queuing determination process, the trajectory analysis unit 22 acquires the image data from the imaging unit 21 and tracks the trajectory of the shopper by analyzing the acquired image data (S401). The trajectory analysis unit 22 stores the information on the trajectory of the shopper in the storage unit 26.

The detection unit 23 detects the shopper's behavior in front of the commodity shelf by analyzing the image data received from the imaging unit 21 and measures the number of goods selected from the commodity shelf by the shopper (S402).

The detection unit 23 associates the information for identifying the shopper with the information on the number of goods selected from the commodity shelf by the shopper and stores them in the storage unit 26 as the information on shopper/number of selected goods (S403).

The measurement unit 24 detects the shopper stagnating in the area in front of the register from the image data received from the imaging unit 21. When a plurality of registers are released, the measurement unit 24 detects the shopper stagnating in the area in front of the register for each available register. Here, the term "stagnate" means a state in which the shopper remains in the same area for more than a predetermined period of time. Further, the measurement unit 24 does not necessarily detect only the shopper who remains in the same area for more than a predetermined period of time. Alternatively, the measurement unit 24 may detect the shoppers present in the area in front of the register and calculate the sum of the numbers of goods selected by the detected shoppers.

When the shopper stagnates in the area in front of the register ("Yes" in S404), the measurement unit 24 looks up the information on shopper/number of selected goods that is stored in the storage unit 26. The measurement unit 24 not only identifies the shoppers stagnating in the area in front of the register but also calculates the sum of the numbers of goods selected by the shoppers stagnating in the area in front of the register on the basis of the information on shopper/number of selected goods that is referred to (S405). The steps S401 to S405 of the second register queuing determination process are the same as the steps S301 to S305 of the first register queuing determination process, respectively.

The measurement unit 24 calculates the sum of the numbers of goods selected by the shoppers stagnating in the area in front of the register for each available register and predicts the shopper queuing time for each register on the basis of the calculated sum of the numbers of goods. For example, the measurement unit 24 may use a value obtained by multiplying the sum of the numbers of goods by an average processing time required to register one good as the predicted shopper queuing time.

Next, the measurement unit 24 determines whether or not a difference between the predicted shopper queuing times of available registers is greater than a threshold value (S406). When the difference between the predicted shopper queuing times of available registers is greater than the threshold value ("Yes in S406), the measurement unit 24 guides the shopper to the register of which the shopper queuing time is shorter by using the report unit 25 (S407). For example, when the shopper queuing time of a register No. 4 is shorter than that of a register no. 1, the measurement unit 24 may make an announcement saying that "the shopper waiting in the line at the register No. 1 is requested to move to the register No. 4" in the store. In this case, the report unit 25 may be a speaker in the store. Alternatively, the measurement unit 24 may emphatically display a register number of the register of which the predicted shopper queuing time is shorter in comparison with the display of the register number of another register. In this case, the report unit 25 may be a display or an electronic message board.

Modification Example

The in-store monitoring device 1 according to a modification example may not perform a shopper trajectory analysis and a detection of the shopper's behavior in front of the commodity shelf. Instead, an external device (for example, a network server) may perform the shopper trajectory analysis and the detection of the shopper's behavior in front of the commodity shelf. In the present modification example, the in-store monitoring device 1 receives a result of the trajectory analysis and a result of the detection of the shopper's behavior in front of the commodity shelf from the external device. Alternatively, the external device may generate the information on shopper/number of selected goods and store it in the storage unit 26, and the in-store monitoring device 1 may acquire the information on shopper/number of selected goods that is stored in the storage unit 26 by the external device.

In the configuration of the present modification example, the in-store monitoring device 1 may not include the trajectory analysis unit 22 and the detection unit 23. In other words, a computer resource required to perform a process of analyzing the shopper trajectory (S301 in FIG. 3 and S401 in FIG. 4) and a process of detecting the shopper's behavior in front of the commodity shelf (S302 in FIG. 3 and S402 in FIG. 4) can be reduced.

Effect of the Present Example Embodiment

According to the configuration of the present example embodiment, the information for identifying the shopper and the information on the number of goods selected by the shopper are associated with each other and stored. By using such information, the sum of the numbers of goods selected by the shoppers stagnating in front of the register can be calculated.

For example, the shopper queuing time can be predicted on the basis of the sum of the numbers of goods selected by the shoppers. When the predicted shopper queuing time is longer than a threshold value, an instruction may be issued to the store clerk to additionally open another cash register or the shopper may be guided to the cash register of which the predicted shopper queuing time is shorter. By this operation, the congestion in front of the register can be reduced or eliminated, and additionally, an effect of improving a shopper satisfaction degree can be expected.

Example Embodiment 2

An in-store monitoring device according to the present example embodiment will be described with reference to FIG. 5.

(Configuration of an in-Store Monitoring Device 2)

Figure 5:
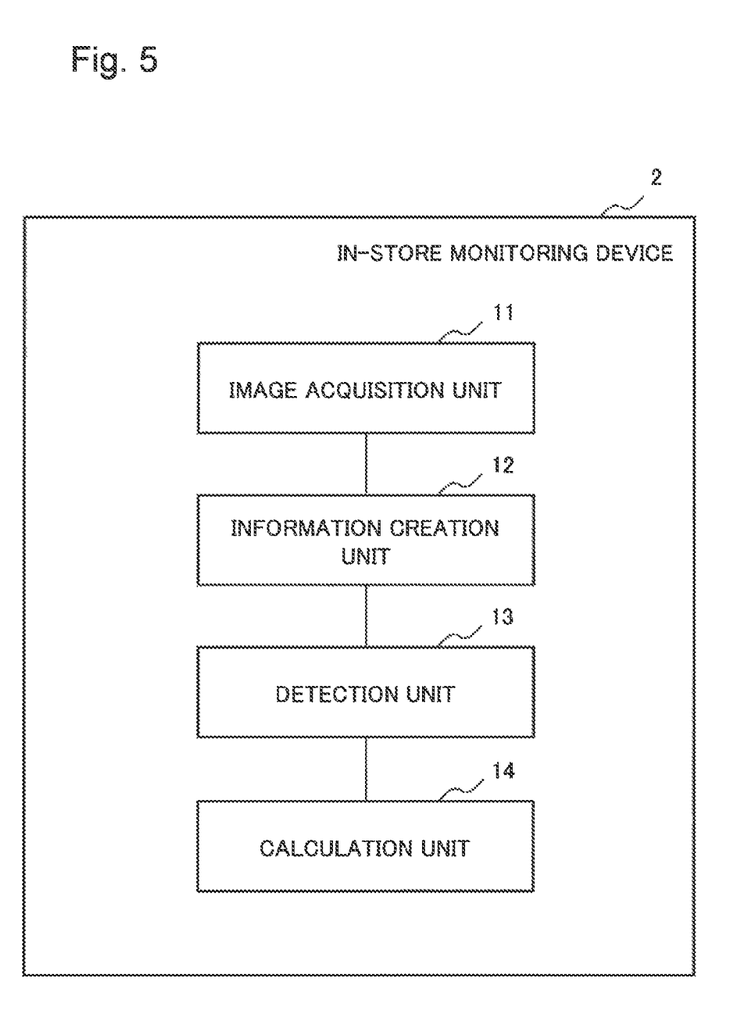
FIG. 5 is a block diagram showing a configuration of an in-store monitoring device according to an example embodiment 2.

FIG. 5 is a block diagram showing a configuration of the in-store monitoring device 2 according to the present example embodiment. As shown in FIG. 5, the in-store monitoring device 2 includes an image acquisition unit 11, an information generation unit 12, a detection unit 13, and a calculation unit 14. Although it is not shown in the figure, the in-store monitoring device 2 acquires the image data captured by an external imaging device (for example, a camera). Further, the in-store monitoring device 2 stores the information on shopper/number of selected goods in an external storage device (for example, a memory). However, the in-store monitoring device 2 may include the imaging device and the storage device. The information on shopper/number of selected goods is information in which the information for identifying the shopper (for example, the information on the trajectory of the shopper and the image data in which the shopper is imaged) is associated with the information on the number of goods selected by the shopper in the store.

The image acquisition unit 11 acquires the image in which the shopper is captured. The image acquired by the image acquisition unit 11 may be an image generated from the image data captured by the external imaging device.

The information generation unit 12 generates the information on the number of goods selected by each shopper from the images for each shopper. The information generation unit 12 may associate the information for identifying the shopper with the information on the number of goods selected by the shopper and store resultant information in the storage unit (not shown) as the information on shopper/number of selected goods.

The detection unit 13 detects the shopper present in the predetermined area. The calculation unit 14 calculates the sum of the numbers of goods selected by the shoppers detected by the detection unit 13.

Effect of the Present Example Embodiment

According to the configuration of the present example embodiment, the information on the number of goods selected by each shopper is generated from the images for each shopper, and the sum of the numbers of goods selected by the shoppers present in the predetermined area is calculated. The shopper queuing time depends on the sum of the numbers of goods selected by the shoppers present in the predetermined area. Accordingly, the shopper queuing time can be correctly calculated on the basis of the sum of the numbers of goods selected by the shoppers who form a line in front of the cash register.

Example Embodiment 3

An in-store monitoring device according to the present example embodiment will be described with reference to FIG. 6.

(Configuration of an in-Store Monitoring Device 3)

Figure 6:
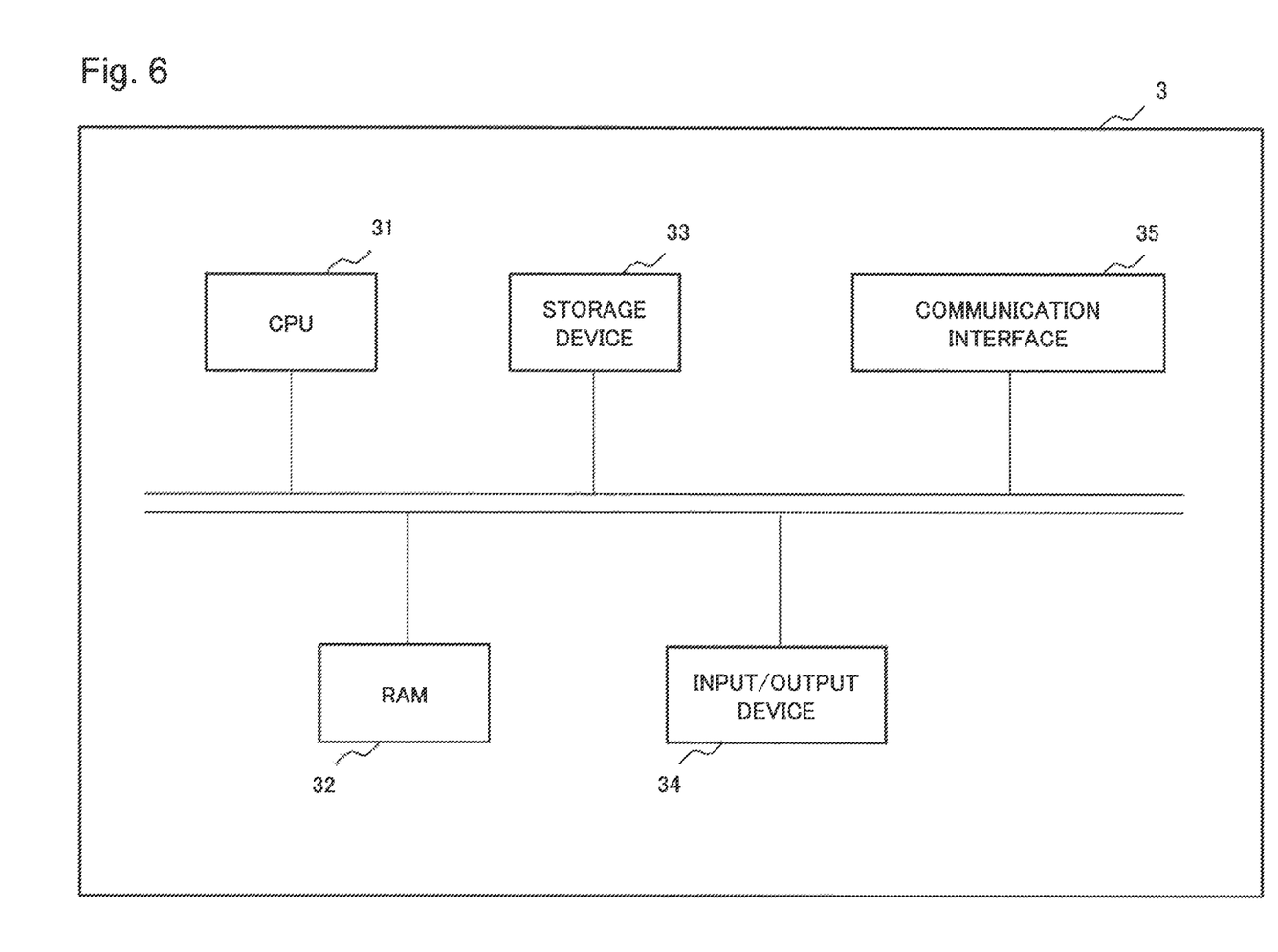
FIG. 6 is a figure showing a hardware configuration of an in-store monitoring device according to an example embodiment 3.

FIG. 6 is a figure showing a configuration of the in-store monitoring device 3 according to the present example embodiment. The in-store monitoring device 3 is realized by a computer device as hardware. The in-store monitoring device 3 includes a central processing unit (CPU) 31, a random access memory (RAM) 32, a storage device 33, an input/output device 34, and a communication interface 35.

The function of the in-store monitoring device 3 is the same as that of the in-store monitoring device 1 according to the example embodiment 1 or the in-store monitoring device 2 according to the example embodiment 2. In other words, the in-store monitoring device 3 realizes the operation of the function block included in the in-store monitoring device 1 according to the example embodiment 1 or the in-store monitoring device 2 according to the example embodiment 2. The function of the in-store monitoring device 3 is realized by executing a program that is read in the RAM 31 by the CPU 31.

The storage device 33 includes the storage unit 26 according to the example embodiment 1. The information on shopper/number of selected goods is stored in the storage device 33.

The input/output device 34 includes the report unit 25 according to the example embodiment 1. The input/output device 34 may include a user interface such as a display or the like.

The communication interface 35 is used for receiving the image data from the external imaging device.

Effect of the Present Example Embodiment

According to the configuration of the present example embodiment, the function of the in-store monitoring device described in the example embodiment 1 or the example embodiment 2 is realized as hardware by using a computer resource such as the CPU or the like. Further, by detecting the shopper present in the area in front of the register, the shopper and the number of goods selected by the shopper can be correctly measured for each shopper. By calculating the sum of the numbers of goods selected by the shoppers who form a line in front of the cash register, the shopper queuing time can be correctly determined.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

What is claimed is:

1. An in-store monitoring method comprising:
   acquiring an image in which one or more shoppers are captured;
   detecting, from the image, one or more shoppers present in an predetermined area queuing for a register;
   generating, for each of the shoppers, information on number of goods obtained by the shoppers;
   calculating a sum of numbers of goods obtained by the one or more shoppers detected; and
   outputting an alert when the sum of the numbers of goods obtained by one or more shoppers presently queuing in the predetermined area exceeds a threshold value.

2. The in-store monitoring method in accordance with claim 1, further comprising:
   generating information for identifying the shoppers from the image;
   associating the information for identifying the shoppers with the information on the number of goods obtained by each of the shoppers and storing them in a storage; and
   calculating, by referring to the storage, the sum of the numbers of goods obtained by the detected shoppers in the predetermined area.

3. The in-store monitoring method in accordance with claim 2, comprising:
   extracting a feature of each of the shoppers from the image; and
   detecting the one or more shoppers present in the predetermined area based on the information indicating the features of the shoppers.

4. The in-store monitoring method in accordance with claim 3, comprising:
   extracting the feature of the shoppers from faces or appearances of the shoppers.

5. The in-store monitoring method in accordance with claim 2, comprising:
   generating, as the information identifying the shoppers, trajectories of the shoppers by tracking the shoppers; and
   detecting the shoppers present in the predetermined area based on the information indicating trajectories of the shoppers.

6. The in-store monitoring method in accordance with claim 1, comprising:
   in the case there is a plurality of predetermined areas, detecting one or more shoppers present in each of the predetermined areas separately.

7. The in-store monitoring method in accordance with claim 6, further comprising:
   calculating the sum of the number of goods obtained by the shoppers present in each of the predetermined areas, and guiding the shoppers to a predetermined area of which the sum of the number of goods obtained by the shoppers present in the predetermined area is relatively small.

8. An in-store monitoring device comprising:
   a memory storing instructions; and
   at least a processor reading the instructions to perform:
   acquiring an image in which one or more shoppers are captured;
   detecting, from the image, one or more shoppers present in a predetermined area queuing for a register;
   generating, for each of the shoppers, information on number of goods obtained by the shoppers;
   calculating a sum of numbers of goods obtained by the one or more shoppers detected; and
   outputting an alert when the sum of the numbers of goods obtained by one or more shoppers presently queuing in the predetermined area exceeds a threshold value.

9. A non-transitory recording medium storing an in-store monitoring program therein, the in-store monitoring program causing a computer to:
   acquire an image in which one or more shoppers are captured;
   detect one or more shoppers present in an predetermined area queuing for a register;
   generate, for each of the shoppers, information on number of goods obtained by the shoppers;
   calculate a sum of numbers of goods obtained by the detected shoppers one or more shoppers detected; and
   outputting an alert when the sum of the numbers of goods obtained by one or more shoppers presently queuing in the predetermined area exceeds a threshold value.

* * * * *